United States Patent [19]

Kato et al.

[11] Patent Number: 4,999,171

[45] Date of Patent: Mar. 12, 1991

[54] PROCESS FOR RECOVERY OF GALLIUM BY CHELATE RESIN

[75] Inventors: Yasuyuki Kato; Masaaki Matsuda, both of Osaka; Kenji Ochi, Ehime, all of Japan

[73] Assignee: Sumitomo Chemical Co. Ltd., Osaka, Japan

[21] Appl. No.: 388,490

[22] Filed: Aug. 2, 1989

Related U.S. Application Data

[63] Continuation of Ser. No. 174,953, Mar. 29, 1988, abandoned.

[30] Foreign Application Priority Data

Apr. 3, 1987 [JP] Japan .................. 62-83514

[51] Int. Cl.[5] ...................... C22B 58/00; C01G 15/00
[52] U.S. Cl. ......................... 423/112; 423/DIG. 14; 75/743
[58] Field of Search ............... 423/112, DIG. 14; 75/101 BE

[56] References Cited

U.S. PATENT DOCUMENTS

| | | | |
|---|---|---|---|
| 4,193,968 | 3/1980 | Sullivan et al. | 75/101 BE |
| 4,404,174 | 9/1983 | Leveque et al. | 423/112 |
| 4,468,374 | 8/1984 | Kataoka et al. | 423/112 |
| 4,564,659 | 1/1986 | Kataoka et al. | 525/328.2 |

FOREIGN PATENT DOCUMENTS

| | | |
|---|---|---|
| 58-6245 | 1/1983 | Japan . |
| 58-7412 | 1/1983 | Japan . |
| 58-42737 | 3/1983 | Japan . |
| 58-49620 | 3/1983 | Japan . |
| 58-52450 | 3/1983 | Japan . |
| 58-96831 | 6/1983 | Japan . |
| 60-215721 | 10/1985 | Japan . |
| 62-21710 | 1/1987 | Japan . |
| 62-80237 | 4/1987 | Japan . |

OTHER PUBLICATIONS

Duolite ES 466.
Partial Translation of "Kagaku Souchi" (Chemical Apparatus in English Meaning), Oct. 1981, pp. 141–145.

*Primary Examiner*—Theodore Morris
*Assistant Examiner*—Margery S. Phipps
*Attorney, Agent, or Firm*—Cushman, Darby & Cushman

[57] ABSTRACT

A process for recovery of gallium from aqueous solution containing gallium by adsorbing gallium to a chelate resin is disclosed. According to this process, the aqueous solution containing gallium is contacted batchwise with a chelate resin having a high selective adsorptivity for gallium or by flowing the aqueous solution through the resin at a rate of at least 20 parts by volume/hr of the aqueous solution per 1 part by volume of the resin.

7 Claims, No Drawings

PROCESS FOR RECOVERY OF GALLIUM BY CHELATE RESIN

This application is a continuation of Ser. No. 174,953, filed Mar. 29, 1988, now abandoned.

BACKGROUND OF THE INVENTION

The present invention relates to a process for recovery of gallium using a chelate resin from aqueous solution containing gallium. More particularly, it relates to an economical process for recovery of highly pure gallium from aqueous solution containing the same using a chelate resin.

In general, gallium is industrially produced from aqueous sodium aluminate solution, so-called Bayer's solution available from the process of alumina production. This is a very useful raw material because gallium concentration in the Bayer's solution is about 10–500 mg/l.

Hitherto, there are two principal processes for recovery of gallium from this Bayer's solution, namely, (1) electrolyzing the Bayer's solution using mercury as a cathode to convert gallium in the solution to an amalgam, hydrolyzing this amalgam with caustic alkali and then electrolyzing the resulting aqueous alkali gallate solution and (2) precipitating mainly alumina component in the Bayer's solution to increase the proportions of gallium component to alumina component, blowing carbon dioxide into this solution to coprecipitate alumina component and gallium component, dissolving this coprecipitate in caustic alkali and then electrolyzing the resulting aqueous alkali gallate solution. In addition to the above, a process for recovery of gallium from the Bayer's solution has been proposed in which liquid-liquid extraction is effected between aqueous sodium aluminate solution with an extraction solvent comprising an organic solvent and an extractant consisting essentially of a water-insoluble substituted hydroxyquinoline. [cf. Japanese Patent Unexamined Publication (Kokai) Nos. 32411/76, 52289/78 and 99726/79].

The inventors have proposed a process for recovery of gallium using a chelate resin having an amidoxime group [Japanese Patent Unexamined Publication (Kokai) No. 49620/83], a process using a chelate resin having (A) an =NOH group and (B) a functional group capable of forming a chelate bond with said functional group (A) through gallium [Japanese Patent Unexamined Publication (Kokai) No. 52450/83]and a process using a chelate resin having oxine ligand [Japanese Patent Unexamined Publication (Kokai) No. 96831/83].

Furthermore, a process for increase of selective adsorptivity for gallium in aqueous solution containing impurity metals is passing the aqueous solution containing gallium through a chelate resin at an SV (superficial velocity in a column) of 5 $hr^{-1}$ or less. [Japanese Patent Unexamined Publication (Kokai) No. 42737/83].

However, the process of electrolysis with mercury as an cathode as above has the problem that a large amount of mercury dissolves in aqueous sodium aluminate solution and thus is lost during amalgamation. The process of coprecipitation by blowing carbon dioxide also has the problem that the use of carbon dioxide causes carbonization of caustic alkali component in the aqueous sodium aluminate solution, resulting in loss of the caustic alkali. Therefore, these processes are industrially not necessarily satisfactory.

The process of liquid-liquid extraction above has the defects that recovery of gallium per reactants used is industrially not sufficient or selective adsorptivity for gallium is not necessarily high. Furthermore, since the chemical used for recovery of gallium is liquid, a considerable amount of the chemical is dissolved in aqueous sodium aluminate solution and is lost.

The processes for recovery of gallium by various chelate resins which have been proposed by the inventors are superior in selectivity to gallium in aqueous solution containing other impurity metals, but further improvement of adsorptivity has been expected.

The process of passing the solution at $SV = 5$ $hr^{-1}$ or less as above has also the problems that the process is hardly applied when chelate resins employed are inferior in chemical resistance and heat resistance and besides it is not economical because of reduction in producibility per unit time, since increase of selective adsorptivity is attempted by reducing the flowing rate.

SUMMARY OF THE INVENTION

As the result of the inventors' intensive research in an attempt to develop a process for recovery of gallium free from these problems, it has been found that the selectivity is further improved when chelate resins of high selective adsorptivity for gallium are used and flow rate of aqueous solution containing gallium is increased.

DESCRIPTION OF THE INVENTION

That is, the present invention relates to a process for recovery of gallium by contacting an aqueous solution containing gallium with a chelate resin having a high selective adsorptivity for gallium to adsorb gallium to the chelate resin, which is characterized in that said aqueous solution is passed through continuously in order to contact the solution with the chelate resin at a rate of at least 20 parts by volume/hr per part by volume of the chelate resin. Alternatively, the contact may be effected in a batchwise manner.

The aqueous solution containing gallium used in the present invention has no special limitation and there may be used, for example, gallium scrap, zinc and copper slag leaching solutions and aqueous sodium aluminate solution in production of alumina by Bayer's process. The copper slag-leaching model solutions are acid aqueous solutions containing Ga and a large amount of copper in accordance with, for instance, examples 12–14 . However, aqueous sodium aluminate solution produced in Bayer's process, so-called Bayer's solution which is used for industrial production of gallium is generally used in the present invention.

The following explanation will be made referring to, for example, Bayer's solution as the aqueous solution containing gallium.

Generally, Bayer's solution contains 10–500 mg/l of Ga, 50–120 g/l of $Al_2O_3$ and 100–200 g/l of $Na_2O$.

As chelate resins used in the present invention, any chelate resins can be used as far as they have higher adsorptivity for gallium than for other impurity metals.

As these chelate resins, for example, the following may be used.

(1) Chelate resins having (A) an —NOH group and (B) a functional group capable of forming a chelate bond with said functional group (A) through gallium or chelate resins having metal salts of said functional group.

(2) Chelate resins having oxine ligand.

(3) Chelate resins having adsorptivity for gallium which contain at least one of functional groups such as $-NH_2$, $-OH$, $=O$, $-SH$, $=S$,

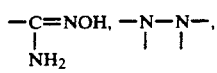

$=NOH$, $-NHOH$, $-P(O)(OH)_2H$ and the like.

More specifically, these chelate resins include those having a functional group having several Lewis base atoms such as N, O and P atoms which are obtained by allowing polymers having a nitrile group such as acrylonitrile-divinylbenzene copolymers having an amine reactive group or a primary and/or secondary amino group, styrenedivinylbenzene copolymers, phenolic resins or polyvinyl chloride to react with hydroxylamine, diethylenetriamine, guanidine, hydrazine, 2,4-diaminophenol, 2,2'-dihydroxy-5-diethylenetriamino-N,N'-ethanediylidenedianiline, acetylacetone, oxalyl chloride or phosphorous acid with formalin.

Chelate resins of any forms such as particulate, spherical, honeycome, fibrous and liquid forms may be used, but chelate resins of solid form are desired from the point of separability of aqueous solution containing gallium and the chelate resin which have been allowed to contact with each other.

Chelate resin of solid form is further preferred because apparent adsorption rate is high, namely, time required for saturation adsorption is short. Therefore, with decrease in resin particle size, contacting time between the resin and the aqueous solution containing gallium can be short and when chelate resin high in gallium adsorption rate as used in the present invention is used, selectivity for gallium is also increased.

With reference to resin particle size, about 150 μ or less is preferred. When resin particle size is more than 150 μ, adsorption rate is determined by internal diffusion rate and a long time is required until adsorption reaches saturation. When the resin particle size is less than 150 μ, no special problem is seen in selective adsorption of gallium and other properties, but since separation operation of the solution and resin after adsorption treatment becomes complicated, fibrous resins or particulate or spherical resins of 50–150 μ in particle size are preferred.

Chelate resins having iminodiacetic acid group are low in selective adsorptivity for gallium and are not suitable in the present invention.

In practice of the present invention, the step of adsorbing gallium to chelate resin by contacting a chelate resin having gallium adsorptivity with an aqueous solution containing gallium is carried out generally at 80° C. or lower, preferably 10°–70° C.

The contact of the chelate resin with aqueous solution containing gallium may be carried out by any methods as far as the aqueous solution is passed through or contacted batchwise with the chelate resin at a rate of 20 parts by volume/hr or higher per part by volume of the chelate resin. For example, the following methods are generally employed:

A method (a batch system) comprising 1 part by volume of a chelate resin in at least 20 parts by volume of aqueous sodium aluminate solution containing gallium and separating said chelate resin from said aqueous solution within one hour; a method (a through flow system) comprising passing aqueous gallium solution through a column packed with a chelate resin or a layer of the chelate resin at a rate of SV of at least 20 hr$^{-1}$; a method (a mixed flow system) comprising feeding quantitatively one part by volume of a chelate resin and at least 20 parts by volume of aqueous gallium solution into a tank from an inlet opening and discharging quantitatively from an exit opening under stirring and contacting so that average retention time of the resin and the aqueous solution in the tank is not longer than 1 hour and then separating the resin from the solution by filtration. From the point of operation, through flow system or mixed flow system is preferred.

Amount of chelate resin used is not critical and may vary depending on concentration of gallium in aqueous sodium aluminate solution and kind of chelate resin used. The amount is able to be fixed by preliminary experiments.

Amount of the aqueous solution containing gallium which contacts with the chelate resin per hour for 1 part by volume of the chelate resin is preferably as large as possible because selective adsorptivity for gallium increases with increase of the amount, but generally is 20–3000 parts by volume. (Hereinafter, SV in the case of the through flow system is employed representatively as the amount of the aqueous solution per hour for 1 part by volume of chelate resins.) Too large amount of the aqueous solution containing gallium is not desirable, since enough contact is hardly possible, or flowing pressure becomes high in case of the through flow system.

It has never been proposed in the process for adsorbing and recovering gallium by a chelate resin from aqueous solution containing gallium and other impurity metals, that selective adsorptivity for gallium markedly increases than for the other metals by the through flow system or batch system where the aqueous solution is contacted with the chelate resin at a rate SV of at least 20 hr$^{-1}$. Thus, it is beyond expectation that the process of the present invention is very effective for recovery of gallium.

It is not sure why selective adsorptivity for gallium increases when the contacting rate SV is at least 20 hr$^{-1}$, but it is assumed as follows: Since reaction rate of a functional group of chelate resin having gallium adsorbability used in the present process with gallium is higher than that of a functional group with other impurity metals [in the following reaction formulas, reaction rate towards right side is (1)>>(2)], the functional group of the resin particles effectively forms a chelate with gallium [reaction towards the right side of the formula (1)]and besides since contacting time of the chelate resin with the aqueous solution containing gallium is so short that the chelate resin is separated from the aqueous solution containing gallium before completion of equilibrium reaction between the Ga.chelate resin and impurity metal (M) as shown by the following formula (3) or in case of the through flow system a fresh solution relatively high in Ga concentration always contacts with the surface of the resin, equilibration towards right side in the formula (3) does not proceed much.

Ga+chelate resin⇌Ga.chelate resin  (1)

Impurity metal (M)+chelate resin⇌M.chelate resin  (2)

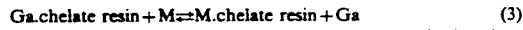

Ga.chelate resin+M⇌M.chelate resin+Ga  (3)

When gallium is recovered using a chelate resin having higher adsorptivity for other impuritY metals than for gallium, a phenomenon opposite to the above occurs [i.e., reaction towards right side is (2)>(1)] and so it is considered that employment of lower flowing rate is advantageous.

Chelate resins used in the present invention which have a high selective adsorptivity for gallium mean that resins with which the reaction towards right side in the above formula (1) is easier to take place than the reaction towards right side of the formula (2).

The chelate resin which has adsorbed and captured gallium by the process of the present invention is then subjected to elution with hydrochloric acid, sulfuric acid, nitric acid, phosphoric acid, sodium sulfide or the like or to heating, thereby to separate gallium from the chelate resin.

Gallium metal is recovered from the thus separated and recovered gallium by conventional method, for example, by converting it into sodium gallate and then electrolyzing it.

As compared with conventional processes for recovery of gallium, according to the process of the present invention, gallium is adsorbed with high selectivity from a solution containing gallium and other impurity metals. Thus, the present process has an advantage that gallium of high purity is recovered and in addition, the amount of chelate resin used is reduced. Therefore, the industrial value of the process is great.

The following nonlimiting examples illustrate the present invention.

EXAMPLE 1

A polymer having amido groups, imino groups, amino groups and oxime groups (referred to as "chelate resin A" hereinafter) was prepared by the reaction of a non-porous polyacrylonitrile fiber of 15 μ (average diameter) with hydroxylamine chloride and aqueous sodium hydroxide solution. This chelate resin A (20 cc) was packed in a column of 30 mm in inner diameter and from the top of the column was passed therethrough 2000 cc of aqueous sodium aluminate solution obtained from Bayer's process for production of alumina and containing 350 mg/l of Ga, 44 g/l of Al and 124 g/l of Na over a period of 30 minutes. Analysis on Ga and Al was conducted to determine amounts of Ga and Al adsorbed on the resin and the results are shown in Table 1.

TABLE 1

| Item | Kinds of metal | | Weight ratio of adsorbed metals Ga/Al |
|---|---|---|---|
| | Ga | Al | |
| Amount of adsorbed metal (mg) | 182 | 41 | 4.4 |

EXAMPLES 2-5

Chelate resin B: A macroporous spherical polymer having an average particle size of 70 μ and average pore size of 500 Å and having hydrazino groups, amino groups, imino groups and oxime groups which was prepared by allowing acrylonitrile-divinylbenzene copolymer to react with mixed aqueous solution of hydroxylamine sulfate and hydrazine.

Chelate resin C: A macroporous spherical polymer having an average particle size of 70 μ and an average pore size of 500 Å and having diethylenetriamino groups and oxime groups which was obtained by allowing acrylonitrile-divinylbenzene copolymer to react with diethylenetriamine to obtain an aminated resin and then allowing this aminated resin to react with hydroxylamine.

Chelate resin D: A macroporous spherical polymer having an average particle size of 70 μ and an average pore size of 500 Å and having triethylenetetramino groups, amino groups and oxime groups which was obtained by subjecting styrene-divinylbenzene copolymer having triethylenetetramino group on side chain to Michael addition reaction with fumaronitrile and then allowing the addition reaction product to react with hydroxylamine.

Chelate resin E: A macroporous spherical polymer having an average particle size of 70 μ and an average pore size of 350 Å and having diethylenetriamino groups, ethylenediamino groups, oxime groups and amino groups which was obtained by allowing a phenol-formalin resin having diethylenetriamino group to react with 2-bromocyanoethane and then allowing the reaction product to react with hydroxylamine chloride and aqueous ethylenediamine solution.

Through each of these chelate resins was flowed 2000 cc of the same aqueous sodium aluminate solution as used in Example 1 over a period of 60 minutes in the same manner as in Example 1 and anaylsis on Ga and Al was conducted to obtain the results as shown in Table 2.

TABLE 2

| Example | Kinds of resin | Amount of Ga adsorbed (mg) | Amount of Al adsorbed (mg) | Weight ratio of metals Ga/Al |
|---|---|---|---|---|
| 2 | Chelate resin B | 243 | 51 | 4.8 |
| 3 | Chelate resin C | 226 | 41 | 5.5 |
| 4 | Chelate resin D | 264 | 51 | 5.2 |
| 5 | Chelate resin E | 197 | 41 | 4.8 |

EXAMPLES 6-11

In the same manner as in Example 1, 4000 cc of the same aqueous sodium aluminate solution as used in Example 1 was flowed through 20 cc of chelate resin B over periods of 10 minutes, 30 minutes, 60 minutes, 120 minutes, 300 minutes and 600 minutes, respectively, and analysis was conducted on Ga and Al to obtain the results as shown in Table 3.

TABLE 3

| Example | Flowing time (min) | Flowing rate SV (hr$^{-1}$) | Amount of Ga adsorbed (mg) | Amount of Al adsorbed (mg) | Weight ratio of adsorbed metals Ga/Al |
|---|---|---|---|---|---|
| 6 | 10 | 1200 | 226 | 21 | 10.8 |
| 7 | 30 | 400 | 232 | 30 | 7.7 |
| 8 | 60 | 200 | 247 | 48 | 5.1 |
| 9 | 120 | 100 | 263 | 61 | 4.3 |
| 10 | 300 | 40 | 281 | 122 | 2.3 |
| 11 | 600 | 20 | 297 | 175 | 1.7 |

COMPARATIVE EXAMPLES 1-4

Commercially available iminodiacetic acid chelate resin (20 cc, DUOLITE ® ES-466; manufactured by Diamond Shamrock Co.) was packed in a column of 30 mm in inner diameter and therethrough was flowed 4000 cc of the same aqueous sodium aluminate solution as used in Example 1 at rates as shown in Table 4, respectively, and analysis was conducted on Ga and Al to obtain the results as shown in Table 4.

TABLE 4

| Comparative Example | Flowing time (min) | Flowing rate SV (hr$^{-1}$) | Amount of Ga adsorbed (mg) | Amount of Al adsorbed (mg) | Weight ratio of adsorbed metals Ga/Al |
| --- | --- | --- | --- | --- | --- |
| 1 | 600 | 20 | 2.3 | 237 | 0.010 |
| 2 | 120 | 100 | 1.6 | 221 | 0.007 |
| 3 | 60 | 200 | 1.1 | 207 | 0.005 |
| 4 | 30 | 400 | 0.9 | 201 | 0.004 |

EXAMPLES 12–14 AND COMPARATIVE EXAMPLES 5–9

To each 1000 cc of copper slag leaching model solution having pH of 2.5 and containing 430 mg/l of Ga and 41 g/l of Cu was added 10 cc of commercially available aminomethylenephosphonic acid chelate resin (SUMICHELATE® MC-95; manufactured by Sumitomo Chemical Co., Ltd.) or 10 cc of iminodiacetic acid chelate resin (DUOLITE® ES-466; manufactured by Diamond Shamrock Co.) and they were allowed to contact with each other under shaking for 10 minutes, 60 minutes, 5 hours, 10 hours and 24 hours, respectively. Thereafter, each of them was subjected to suction filtration over a period of about 1 minute and analysis was conducted on Ga and Cu to obtain the results as shown in Table 5.

TABLE 5

| | Kinds of resin | Batch contacting time (min) | Batch contacting rate SV (hr$^{-1}$) | Amount of Ga adsorbed (mg) | Amount of Cu adsorbed (mg) | Weight ratio of adsorbed metals Ga/Cu |
| --- | --- | --- | --- | --- | --- | --- |
| Example 12 | Aminomethylene phosphonic acid chelate resin | 10 min | 600 | 169 | 27 | 6.26 |
| Example 13 | | 60 min | 100 | 189 | 63 | 3.00 |
| Example 14 | | 5 hr | 20 | 199 | 87 | 2.29 |
| Comparative Example 5 | | 24 hr | 4 | 209 | 114 | 1.83 |
| Comparative Example 6 | Iminodiacetic acid chelate resin | 10 min | 600 | 0.9 | 38 | 0.024 |
| Comparative Example 7 | | 60 min | 100 | 2.3 | 87 | 0.026 |
| Comparative Example 8 | | 5 hr | 20 | 4.7 | 103 | 0.046 |
| Comparative Example 9 | | 24 hr | 4 | 7.8 | 138 | 0.057 |

EXAMPLES 15–22

Chelate resin B (20 cc each) having the same functional groups, but having different particle size was added to 4000 cc of the same aqueous sodium aluminate solution as used in Example 1 under stirring to allow them to contact for 5 minutes. The results as shown in Table 6 was obtained.

TABLE 6

| Example | Average particle size (μ) | Amount of Ga adsorbed (mg) | Amount of Al adsorbed (mg) | Weight ratio of adsorbed metal Ga/Al |
| --- | --- | --- | --- | --- |
| 15 | 31 | 313 | 18 | 17.4 |
| 16 | 49 | 303 | 18 | 16.8 |
| 17 | 83 | 270 | 17 | 15.9 |
| 18 | 97 | 240 | 16 | 15.0 |
| 19 | 151 | 201 | 13 | 15.5 |
| 20 | 198 | 151 | 9 | 16.8 |
| 21 | 312 | 103 | 7 | 14.7 |
| 22 | 501 | 52 | 4 | 13.0 |

We claim:

1. A process for recovery of gallium by contacting an aqueous solution containing gallium and impurity metals contained in Bayer's solution or copper slag-leaching solution with a chelate resin having a higher selective adsorptivity for gallium than for impurity metals, wherein said chelate resin is selected from the group consisting of (1) chelate resins having (A) an =NOH group and (B) a functional group capable of forming a chelate bond with said functional group (A) through gallium or chelate resins having metal salts of said functional group, (2) chelate resins having oxine ligand, and (3) chelate resins having adsorptivity for gallium which contain at least one of functional groups such as —NH$_2$, —OH, =O, —SH, =S,

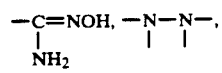

—NHOH, —P(O)(OH)$_2$H, until gallium is adsorbed on said chelate resin, which comprises contacting said aqueous solution with said chelate resin at a rate of at least 20 parts by volume/hr per part by volume of the chelate resin.

2. A process according to claim 7 wherein the contact is effected by flowing the aqueous solution through a layer of the resin.

3. A process according to claim 7 wherein the contact is effected in a batch manner.

4. A process according to claim 7 wherein the aqueous solution containing gallium and other impurity metals is aqueous sodium aluminate solution obtained from Bayer's process for production of alumina.

5. A process according to claim 7 wherein the chelate resin has an oxime group or an aminoalkylenephosphonic acid group.

6. A process according to claim 7 wherein the chelate resin is fibrous resin or particulate or spherical resin having an average particle size of 50-150 μ.

7. A process for recovery of gallium by contacting an aqueous solution containing gallium and impurity metals contained in Bayer's solution or copper slag-leaching solution with a chelate resin, wherein the resin is a fibrous, particulate or spherical resin having an average particle size of 50-150 μ, and has a higher selective adsorptivity for gallium than for impurity metals, wherein said chelate resin is selected from the group consisting of (1) chelate resins having (A) an =NOH group and (B) a functional group capable of forming a chelate bond with said functional group (A) through gallium or chelate resins having metal salts of said functional group, (2) chelate resins having oxine ligand, and (3) chelate resins having adsorptivity for gallium which contain at least one of functional groups such as —NH$_2$, —OH,

—SH, =S, —C=NOH,

=NOH, —NHOH, —P(O)(OH)$_2$H, until gallium is adsorbed on said chelate resin, and wherein said aqueous solution is contacted with said chelate resin at a rate of at least 20 parts by volume/hr per part by volume of the chelate resin.

* * * * *